United States Patent [19]

Ruiz

[11] 4,303,304
[45] Dec. 1, 1981

[54] UNIVERSAL OPTICAL WAVEGUIDE ALIGNMENT FERRULE

[75] Inventor: Frank A. Ruiz, Middletown, Pa.

[73] Assignee: AMP Incorporated, Harrisburg, Pa.

[21] Appl. No.: 99,110

[22] Filed: Nov. 30, 1979

[51] Int. Cl.³ .............................................. G02B 5/14
[52] U.S. Cl. .................................. 350/96.20; 350/320
[58] Field of Search ............... 350/96.15, 96.20, 96.21, 350/96.22, 320

[56] References Cited

U.S. PATENT DOCUMENTS

| | | | |
|---|---|---|---|
| 3,861,781 | 1/1975 | Hasegawa et al. | 350/96.21 |
| 3,897,123 | 8/1975 | Scrivo et al. | 350/96.24 |
| 3,904,269 | 9/1975 | Lebduska et al. | 350/96.22 |
| 3,914,015 | 10/1975 | McCartney | 350/96.22 |
| 3,999,837 | 12/1976 | Bowen et al. | 350/96.22 |
| 4,023,886 | 5/1977 | Nakayama et al. | 350/96.20 X |
| 4,026,972 | 5/1977 | Phillips et al. | 350/96.20 X |
| 4,090,778 | 5/1978 | Phillips et al. | 350/96.20 |
| 4,116,655 | 9/1978 | Lewis | 350/96.22 X |
| 4,127,319 | 11/1978 | Forney, Jr. et al. | 350/96.20 |
| 4,133,601 | 1/1979 | Le Guen et al. | 350/96.21 |
| 4,135,781 | 1/1979 | Archer | 350/96.20 |
| 4,148,557 | 4/1979 | Garvey | 350/96.20 |
| 4,168,109 | 9/1979 | Dumire | 350/96.22 |
| 4,173,389 | 11/1979 | Curtis | 350/96.20 |
| 4,176,909 | 12/1979 | Prunier | 350/96.20 |
| 4,186,999 | 2/1980 | Harwood et al. | 350/96.21 |
| 4,195,045 | 3/1980 | Mead | 350/96.21 X |
| 4,198,119 | 4/1980 | Uberbacher | 350/96.20 |

FOREIGN PATENT DOCUMENTS

| | | | |
|---|---|---|---|
| 2753298 | 5/1979 | Fed. Rep. of Germany | 350/96.20 |
| 2310579 | 12/1976 | France | 350/96.20 |
| 1460548 | 1/1977 | United Kingdom | 350/96.20 |

*Primary Examiner*—John K. Corbin
*Assistant Examiner*—John D. Lee
*Attorney, Agent, or Firm*—Richard B. O'Planick

[57] ABSTRACT

Connector ferrule and method for terminating an optical waveguide cable. The ferrule, of generally truncated conical profile, is configured having a profiled passageway therethrough from a rearward cable receiving portion to a forward bore critically located centrally of a forward ferrule face and sized to allow only the passage of an unclad waveguide portion therethrough. The waveguide cable is secured within the ferrule by adhesive means, with an unclad waveguide portion protruding through the forward ferrule bore and a clad waveguide portion within an intermediate region of the passageway. Thereafter, the forward nose of the ferrule and the unclad waveguide portion therethough are removed to present a clad waveguide face centrally of a forward face of the ferrule.

5 Claims, 4 Drawing Figures

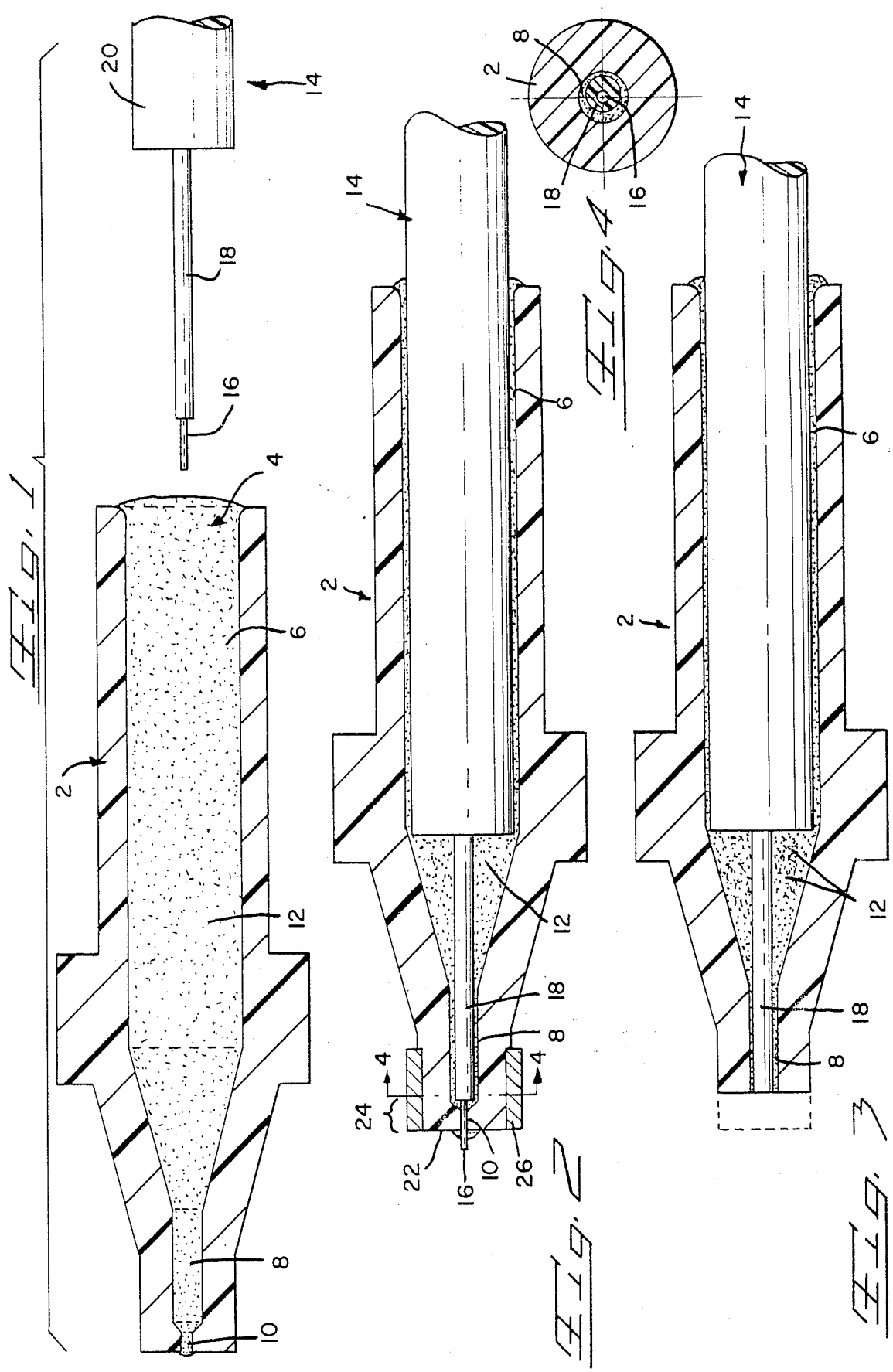

UNIVERSAL OPTICAL WAVEGUIDE ALIGNMENT FERRULE

BACKGROUND OF THE INVENTION

1. Field of the Invention

The present invention relates to a connector ferrule, and method for using same, for the termination of an optical waveguide. Specifically, the ferrule is of a type which is radially compressible upon the insertion of the ferrule into a connector housing.

2. The Prior Art

Achievement of connectors for axially aligning and mechanically coupling optical waveguides has been hindered by the nonuniform configuration of optical waveguide cables. Typical cables comprise a center waveguide core which is surrounded by optical cladding for deterring the escape of transmitted light signals from the waveguide core. Because the waveguide cladding layer of available cables is not necessarily manufactured concentric about the waveguide core, connectors which align waveguide center cores by referencing off of the clad outer diameter of the waveguide cable are not always effective in achieving certain axial positioning of the waveguide core. Attempts to align waveguide cores directly, by removing the cladding from therearound, have also failed because of performance degradation at the coupling interface due to the exposure of the unclad waveguide portion.

U.S. Pat. No. 3,999,837 teaches a connector for coupling optical waveguide bundles. Pursuant to this approach, a ferrule is taught for collecting the waveguides in a profiled ferrule passageway, and a centering bushing is further proposed for centering the ferrule and waveguide during a polishing step in the terminating procedure. While this approach works well and is well received by the industry, certain shortcomings prevent this connector from representing an ideal solution to the industry's problems. First, by requiring a centering bushing, the cost of manufacture of the resulting connector is increased. Secondly, many cables are configured having clad waveguide center cores, and this connector approach is illsuited for termination of such a cable. U.S. Pat. No. 4,186,999 teaches a ferrule having a profiled passageway extending therethrough from a cable receiving rearward portion to a forward bore dimensioned to allow an unclad optical fiber to pass therethrough. Plastics material is introduced into the bore and passageway having an index of refraction approximating the index of refraction of the waveguide cladding. The connector so taught achieves centering of the waveguides by critically positioning the bore through a forward nose of the ferrule, and references directly off of the waveguide core itself. While direct referencing is desirable, the substituted plastics material only approximates the cladding of the waveguide, and the discontinuity between the cladding and the index of refraction matching material can still result in an optical loss at the junction. Also, core diameters can vary from cable to cable, so a more universal ferrule approach is desirable.

SUMMARY OF THE PRESENT INVENTION

The present invention comprises an improved ferrule and method for terminating an optical waveguide. The ferrule is adapted having a profiled passageway extending therethrough from a cable receiving rearward portion to an intermediate portion, and extending further to a forward bore dimensioned to allow only the passage of an unclad waveguide therethrough. In accordance with the subject teachings, cladding of the waveguide is removed from a forward length of the cable, and the cable thereafter is inserted into the ferrule passageway with the unclad portion of the waveguide protruding through the ferrule bore, and with a clad portion of the waveguide positioned within the intermediate portion of the passageway. Subsequently, the unclad waveguide portion and a portion of the ferrule therearound are removed in a polishing step in the termination procedure to expose a face of the clad waveguide centrally of a forward face of the alignment ferrule. In the terminated condition, therefore, the waveguide core is completely clad through to a forward face of the ferrule, and can thereafter be aligned with a second like-terminated waveguide in a manner conventional to the industry.

Accordingly, it is an object of the present invention to provide an improved connector ferrule for axially aligning a clad optical waveguide.

It is a further object of the present invention to provide an improved connector ferrule for axially centering an optical waveguide core having a cladding thickness therearound variable within limits.

It is still a further object of the present invention to provide a method for effecting alignment of an optical waveguide cable in a connector ferrule so that the waveguide core is presented in a clad condition centrally of a forward face of the ferrule.

Still further, it is an object of the present invention to provide a method for axially centering an optical waveguide core regardless of its concentricity within an outer cladding layer.

A still further object is to provide a radially compressing ferrule nose to allow for variations in optical fiber core diameter.

It is a further object of the present invention to provide an improved ferrule which is readily and economically produced.

Still a further object of the present invention is to provide a method for readily effecting the termination of an optical waveguide.

These and other objects which will become apparent to one skilled in the art, are achieved by a preferred embodiment which is described in detail below and which is illustrated in the accompanying drawings.

BRIEF DESCRIPTION OF THE ACCOMPANYING DRAWINGS

FIG. 1 is a side elevation view in section of the subject optical waveguide ferrule and prepared optical waveguide cable.

FIG. 2 is a side elevation view in section of the subject waveguide ferrule having the prepared optical waveguide cable inserted therein.

FIG. 3 is a side elevation view in section of the subject optical waveguide ferrule having a forward portion removed pursuant to the teachings of the present invention.

FIG. 4 is a transverse sectional view through the subject optical waveguide ferrule taken along the line 4—4 of FIG. 2.

DETAILED DESCRIPTION OF THE PREFERRED EMBODIMENT

Referring first to FIG. 1, the subject optical waveguide ferrule 2 of a generally truncated conical profile integrally, is formed of plastics material and adapted having a profiled axial passageway 4 extending therethrough from a rearward, relatively large, cable receiving portion 6, to an intermediate, smaller diametered portion 8, and ultimately to a forward bore 10 of prescribed small diametric dimension. Adhesive material, for example, epoxies commonly available to the industry, is introduced into the profiled passageway 4 as indicated at numeral 12. The subject ferrule 2 is intended to terminate an optical waveguide cable 14 comprising a central waveguide core 16, an intermediate cladding layer 18, and an outer sheath 20. A typical waveguide core would be formed of fused silica (silicon dioxide), clad with a layer of optical plastic such as silicone rubber. Cables of this type are conventional to the industry, and as best shown by FIG. 4, the intermediate cladding layer 18 of such cables is not necessarily concentric about the center core 16 of the cable. Nonconcentricity presents numerous problems in the termination of such a cable since the center core 16 must be fixedly referenced in a readily ascertainable location in order to permit the axial alignment of a second waveguide cable core (not shown) therewith. The waveguide core 14 (FIG. 1) is prepared for termination having the intermediate cladding layer removed from a forward axial length of the waveguide center core 16. The outer sheath 20 of the cable 14 is further removed from a forward clad axial length of the center core 16. It will be appreciated that the diameter of the waveguide core 16 can vary from the cable to cable as per the cable specification.

Referring now to FIG. 2, termination of the optical waveguide 14 is initiated upon insertion of the cable into the profiled passageway 4 of the ferrule 2, with the forward exposed end of the waveguide center core 16 projecting through the forward bore 10 of the ferrule, and the exposed clad portion of the center waveguide core 16 seated in the intermediate portion 8 of the profiled passageway 4. The forward bore 10 is dimensioned to closely allow only the unclad waveguide core therethrough, with clearance.

The forward bore 10, therefore, can accommodatingly receive a waveguide core having a diametric dimension variable within limits. By virtue of such accommodation, the ferrule can terminate a variety of waveguide cables, each potentially having slightly differing dimensions. The ferrule is thereby said to be universal in application. Note that the forward bore 10 communicates with a forward face 22 of the ferrule 2, and is preferably precision located, by drilling or other known techniques, at the epicenter of the ferrule face 22. Also, it should be noted that the clad waveguide portion seated within the intermediate portion 8 of the passageway 4 is accommodated with clearance in order to allow for a potentially nonconcentric geometry of the inserted cable, as well as to enable the receipt of a clad cable core having a clad outer diameter dimension variable within limits. In other words, the intermediate portion 8 of the passageway 4 is oversized in relation to the clad waveguide core outer diameter, and can therefore accept any one of a number of cables each having a different clad outer dimension. Subsequent to the insertion of the cable into the profiled passageway 4, a fixture 26 is brought into circumferential engagement with the forward nose of the ferrule, and exerts a radial force thereon. Responsive thereto, the ferrule nose radially collapses upon the unclad waveguide core. The epoxy material 12 is then permitted to cure to thereby fixedly position and retain the waveguide cable within the ferrule 2. A fixture of the general type indicated at numeral 26 is disclosed in U.S. Pat. No. 3,999,837 hereby incorporated by reference.

FIG. 3 illustrates the final step in the termination procedure, whereby a forward length of the ferrule (indicated at numeral 24 of FIG. 2) and the unclad waveguide core portion extending therethrough is removed, and thereafter, the forward end of the ferrule and waveguide are polished in order to achieve a suitably smooth surface at the forward coupling face of the assembly. It will be appreciated from a viewing of FIG. 3 that the waveguide in the final terminated state extends forward uninterrupted to a forward end of the ferrule 2, and retains its original cladding layer 18 continuously therealong. This enables the present ferrule to achieve improved optical performance over previous ferrules known in the art. Ferrules of this general type are intended for further termination in a connector housing of the type illustrated in U.S. Pat. No. 4,186,999 the disclosure of which being incorporated herein by reference. In such termination techniques, it is critical that the center core 16 of the waveguide cable be axially positioned with great certainty. It will be appreciated that the terminated waveguide cable as illustrated in FIG. 3 satisfies this requirement since the location of the center waveguide core 16 is preserved central of the ferrule forward face. Thus, the subject optical waveguide ferrule can receive an optical waveguide cable possibly having a clad core, or unclad core, outer diameter which is variable within limits, and function to achieve accurate referencing of the center core regardless of the cladding to core concentricity and geometry. The embodiment of FIG. 4 illustrates that continuity in the cladding layer is preserved forward to a forward face of the ferrule subsequent the termination procedure. Continuous preservation of the cladding about the cable center core 16 to the coupling face minimizes transmission losses.

The present invention may be subject to many modifications without departing from the spirit of essential characteristics thereof. The present embodiments should therefore be considered as illustrative and not restrictive of the scope of the subject invention.

What is claimed is:

1. A ferrule for terminating an optical waveguide having a center core, an intermediate cladding layer surrounding the core, and an outer sheath surrounding the clad core, said ferrule comprising:

a ferrule body of generally truncated conical profile having a profiled passageway therethrough from a cable receiving rearward passageway portion to a forward bore dimensioned to allow a clad portion of the optical waveguide core therethrough;

said ferrule body having radially compressible and removable alignment means at a forward end, said alignment means having a centering bore therethrough in communication with said ferrule body bore and located on the axis of said body bore, said centering bore being dimensioned to receive an unclad waveguide core portion therethrough with clearance, whereby upon radially compressing said alignment means upon said unclad waveguide core portion, and removing said alignment means and said unclad core portion extending therethrough, a forward face of said waveguide core is presented on the axis of said ferrule body bore and having said cladding layer therearound.

2. A ferrule as set forth in claim 1, wherein said ferrule body has adhesive means within said profiled passageway for securing said waveguide therein.

3. Method of terminating an optical waveguide cable in a ferrule of generally truncated conical profile having a profiled passageway therethrough from a cable receiving rearward passageway portion to a forward bore of sufficient size to allow only the passage of an unclad portion of an optical waveguide therethrough, comprising the steps of:

inserting the waveguide cable into the cable receiving passageway portion of the ferrule with a clad portion of the optical waveguide positioned intermediate of the profiled passageway and an unclad portion of the optical waveguide projecting through the forward ferrule bore;

axially securing said cable within said ferrule passageway;

radially compressing the portion of the ferrule around the unclad waveguide portion so that the forward ferrule bore is of substantially the same size as the unclad waveguide diameter; and removing the unclad waveguide portion and the portion of the ferrule therearound so that a clad face of said optical waveguide is presented at a forward face of the ferrule.

4. The method of claim 3 wherein removing the unclad waveguide portion and the ferrule portion therearound comprises polishing back forward surfaces of the ferrule and the waveguide.

5. The method of claim 3 wherein axially securing said cable within said ferrule passageway comprises the step of introducing adhesive material into the profiled ferrule passageway and bore prior to inserting the cable into the passageway, and the step of curing the adhesive material subsequent to inserting the cable into the passageway.

* * * * *